United States Patent
Praden (10) Patent No.: US 8,417,944 B2
(45) Date of Patent: Apr. 9, 2013

(54) CONTROLLING ACCESS IN A TERMINAL DEVICE TO SERVICES BROADCAST IN MULTICAST MODE

(75) Inventor: Anne-Marie Praden, Ventabren (FR)

(73) Assignee: Gemalto SA, Meudon (FR)

( * ) Notice: Subject to any disclaimer, the term of this patent is extended or adjusted under 35 U.S.C. 154(b) by 0 days.

(21) Appl. No.: 12/158,645

(22) PCT Filed: Dec. 19, 2006

(86) PCT No.: PCT/EP2006/069896
§ 371 (c)(1),
(2), (4) Date: Jun. 20, 2008

(87) PCT Pub. No.: WO2007/071669
PCT Pub. Date: Jun. 28, 2007

(65) Prior Publication Data
US 2008/0295140 A1    Nov. 27, 2008

(30) Foreign Application Priority Data

Dec. 22, 2005   (FR) ..................................... 05 54055

(51) Int. Cl.
*H04L 29/06*        (2006.01)
(52) U.S. Cl.
USPC .............................................. 713/163; 726/3
(58) Field of Classification Search .................. 726/2, 3, 726/4, 5; 370/461; 713/162, 163
See application file for complete search history.

(56) References Cited

U.S. PATENT DOCUMENTS

| 6,021,429 | A  | * | 2/2000 | Danknick ...................... 709/208 |
| 6,526,582 | B1 | * | 2/2003 | Brodigan et al. ............... 725/87 |
| 6,970,461 | B2 | * | 11/2005 | Unitt et al. .................... 370/390 |
| 7,080,153 | B2 | * | 7/2006 | Monteiro et al. ............. 709/231 |
| 7,200,860 | B2 | * | 4/2007 | Ghaffar ............................ 726/2 |
| 7,565,554 | B2 | * | 7/2009 | Joosten et al. ................ 713/193 |
| 8,005,983 | B2 | * | 8/2011 | Hopen et al. .................. 709/238 |
| 2003/0005447 | A1 | * | 1/2003 | Rodriguez ....................... 725/51 |
| 2003/0140237 | A1 | * | 7/2003 | Bacon et al. .................. 713/189 |
| 2004/0117829 | A1 | * | 6/2004 | Karaoguz et al. .............. 725/46 |
| 2004/0128680 | A1 |   | 7/2004 | Karaoguz et al. |
| 2004/0177273 | A1 | * | 9/2004 | Ghaffar ......................... 713/201 |
| 2004/0240466 | A1 | * | 12/2004 | Unitt et al. .................... 370/461 |

(Continued)

FOREIGN PATENT DOCUMENTS

DE          103 39 349 A1    3/2005
WO     WO 02/097997 A2    12/2002

OTHER PUBLICATIONS

Form PCT/ISA/210 (International Search Report) dated Mar. 29, 2007.

*Primary Examiner* — David Garcia Cervetti
(74) *Attorney, Agent, or Firm* — Buchanan Ingersoll & Rooney PC (57) ABSTRACT

In a terminal device for controlling access to multicast services over a broadcasting network, an application outputs a user-preselected broadcast service request to a router that receives the broadcast services. The request contains an address of the selected service. The device includes a filtering entity that compares the address in the request with addresses in an address list generated on the basis of at least one filtering criterion, in order to authorize the transmission of the selected service from the router to the application so that the service is delivered when the address is included in the list.

8 Claims, 3 Drawing Sheets

U.S. PATENT DOCUMENTS

| | | |
|---|---|---|
| 2004/0255321 A1 | 12/2004 | Matz |
| 2005/0049933 A1* | 3/2005 | Upendran et al. ............... 705/26 |
| 2005/0049957 A1* | 3/2005 | Vakili et al. ..................... 705/37 |
| 2005/0050160 A1* | 3/2005 | Upendran et al. ............ 709/217 |
| 2005/0097595 A1* | 5/2005 | Lipsanen et al. ................ 725/25 |
| 2005/0114901 A1 | 5/2005 | Yui et al. |
| 2005/0229248 A1* | 10/2005 | Coley et al. ..................... 726/21 |
| 2005/0289592 A1* | 12/2005 | Vermola ......................... 725/45 |
| 2006/0004726 A1* | 1/2006 | Blank ............................... 707/3 |
| 2006/0143703 A1* | 6/2006 | Hopen et al. .................... 726/15 |
| 2006/0248203 A1* | 11/2006 | Yamaoka et al. ............. 709/228 |
| 2007/0050836 A1* | 3/2007 | Stanek et al. ................. 725/131 |

\* cited by examiner

CONTROLLING ACCESS IN A TERMINAL DEVICE TO SERVICES BROADCAST IN MULTICAST MODE

FIELD

The present invention relates to controlling access to services that are broadcast by a broadcasting network.

More particularly, it relates to controlling access to services that are broadcast in multicast mode, the access control being executed in a user terminal device.

BACKGROUND

A broadcasting network to which the invention is applicable can be a one-way network and transmit service signals to all of the user devices connected to the network, certain services being accessible only as a function of an access right. The applications that are the most well known are broadcasting of television and/or radio-broadcasting signals, e.g. via a data broadcasting network of any of the following types: DVB (Digital Video Broadcasting), DAB (Digital Audio Broadcasting), DMB (Digital Multimedia Broadcasting), DTT or DTTV (Digital Terrestrial Television), ISDB-T (Integrated Services Digital Broadcasting-Terrestrial), MBMS (Multimedia Broadcast Multicast Service) and BCMCS (Broadcast Multicast Service) over mobile telephone networks such as third-generation or fourth-generation mobile telephone networks etc., or the Internet. In another example, a Wireless Local Area Network (WLAN) can be used as the broadcasting network. The invention also applies to the system defined by the OMA-BCAST (Open Mobile Alliance-Broadcast) specification.

A broadcasting channel of a broadcasting network transmits a number of services that varies as a function of the passband available for transmitting data. In order to enable a user to discover all of the services broadcast via the broadcasting network, at least one description service for describing the broadcast services and referred to as an "Electronic Service Guide" (ESG) is proposed. The description service is broadcast by the broadcasting network, or transmitted by a point-to-point telecommunications network such as a cellular radiocommunications network, to user mobile terminals at their request.

The electronic service guide contains various information about the services broadcast by the broadcasting network. Those services are, for example, television programs including, in particular, films, documentaries, and/or magazines. The electronic service guide constitutes the point of access to the services that are broadcast more particularly for the user of a mobile terminal. Depending on the information in the guide, users select a service that they wish to obtain, e.g. for viewing purposes. The service guide also has service description information such as an associated rating code or an identifier of the service provider.

Giving access to the services broadcast by the broadcasting network for all audiences goes against restricting viewing of services that are for viewing by one category of users only.

For example, a child can then view a service that is intended exclusively for adults.

In another example, certain services are broadcast by an operator who is a competitor of the initial operator whom the user chose and who supplied the terminal device to said user. The initial operator can then not restrict the available services to only those services that it provides and/or that are provided by a partner.

In order to mitigate those drawbacks, a "Conditional Access System" (CAS) or "Key Management System" (KMS) supplied by a service broadcasting operator makes service viewing on a terminal device conditional upon possessing a right of access to the services that the operator is broadcasting. Those services are encrypted before being broadcast over the broadcasting network. In order to view the service, the user must first purchase access rights, represented in the form of decryption keys, from the operator who is offering the service.

Unfortunately, no protection prevents viewing of certain services that are broadcast unencrypted over the broadcasting network but that are unsuitable, for example, for children.

There is thus a need to have a protection system that is capable of enabling a possessor of a terminal device to restrict viewing of services broadcast unencrypted over a broadcasting network.

In addition, such conditional access systems generally act on services that are broadcast in ordinary mode. Ordinary broadcasting requires all of the services broadcast over the network to be processed by a terminal device before the desired broadcast service(s) is/are selected, such processing requiring considerable real-time processing capacity.

SUMMARY

An object of the invention is to provide access control for controlling access to services that are broadcast by a broadcasting network, which access control is implemented directly in a user terminal device, in order to restrict access to those services on the basis of specific criteria and in order to reduce the length of time required for selecting the broadcast services.

In order to achieve this object, a method implemented in a terminal device for the purpose of controlling access to services that are broadcast in multicast mode via a broadcasting network, said method comprising making a request for a previously selected broadcast service from request issuer means to broadcast service receiver means, the request containing an address of the selected service, is characterized in that it further comprises:

comparing the address contained in the request with addresses contained in an address list; and when the list comprises addresses of services that are deemed to be authorized, authorizing transmission of the selected service from the receiver means to the request issuer means so as to present said service if the address is included in the list, and, when the list comprises addresses of services that are deemed to be unauthorized, not authorizing transmission of the selected service from the receiver means to the request issuer means so as not to present said service if the address is included in the list.

The invention controls directly in the terminal device access to all of the services broadcast via the broadcasting network, both encrypted services and services that are broadcast unencrypted.

The multicast mode applied in the invention advantageously offers a broadcast service processing time in the terminal device that is shorter than in the ordinary broadcast mode. The addresses of the services broadcast in multicast mode to be selected can be extracted directly from the IP packets at the network protocol layer which is a low layer. Conversely, in ordinary broadcast mode, identifiers of the broadcast services to be selected are extracted from the application layer which is a higher layer, thereby giving rise to processing through all of the protocol layers and thus to a longer time for accessing a service to be selected.

According to a characteristic of the invention the method further comprises:

making a prior request for an electronic service guide broadcast by the broadcasting network from means for establishing an address list to the broadcast service receiver means, said electronic service guide containing description data describing the other broadcast services;

filtering the description data relating to the broadcast services as a function of at least one filtering criterion;

searching for the addresses of broadcast services in the filtered description data; and establishing the address list with the addresses found through the search.

A filter criterion may depend on a digitized code corresponding to parental control and/or on an identifier of an operator managing the broadcasting network or of a partner of the operator.

The invention also provides a terminal device for controlling access to services that are broadcast in multicast mode via a broadcasting network, said terminal device comprising receiver means for receiving the broadcast services and request issuer means for issuing a request for a previously selected broadcast service to the receiver means, the request containing an address of the selected service. The device is characterized in that further comprises a filter entity for comparing the address contained in the request with addresses contained in an address list;

the filter entity authorizing transmission of the selected service from the broadcast service receiver means to the request issuer means so as to present said service if the address is included in the list and when the list comprises addresses of services that are deemed to be authorized; and the filter entity not authorizing transmission of the selected service from the receiver means to the request issuer means so as not to present said service if the address is included in the list and when the list comprises addresses of services that are deemed to be unauthorized.

Finally, the invention provides a program suitable for being implemented in a terminal device for controlling access to services that are broadcast via a broadcasting network, said program comprising instructions that, when the program is executed in said terminal device, implement, in particular, the comparison and authorization steps of the method of the invention.

DESCRIPTION OF THE DRAWINGS

Other characteristics and advantages of the present invention appear more clearly on reading the following description of preferred embodiments and implementations of the invention, given by way of non-limiting example and with reference to the corresponding accompanying drawings, in which.

DETAILED DESCRIPTION

Figure 1:
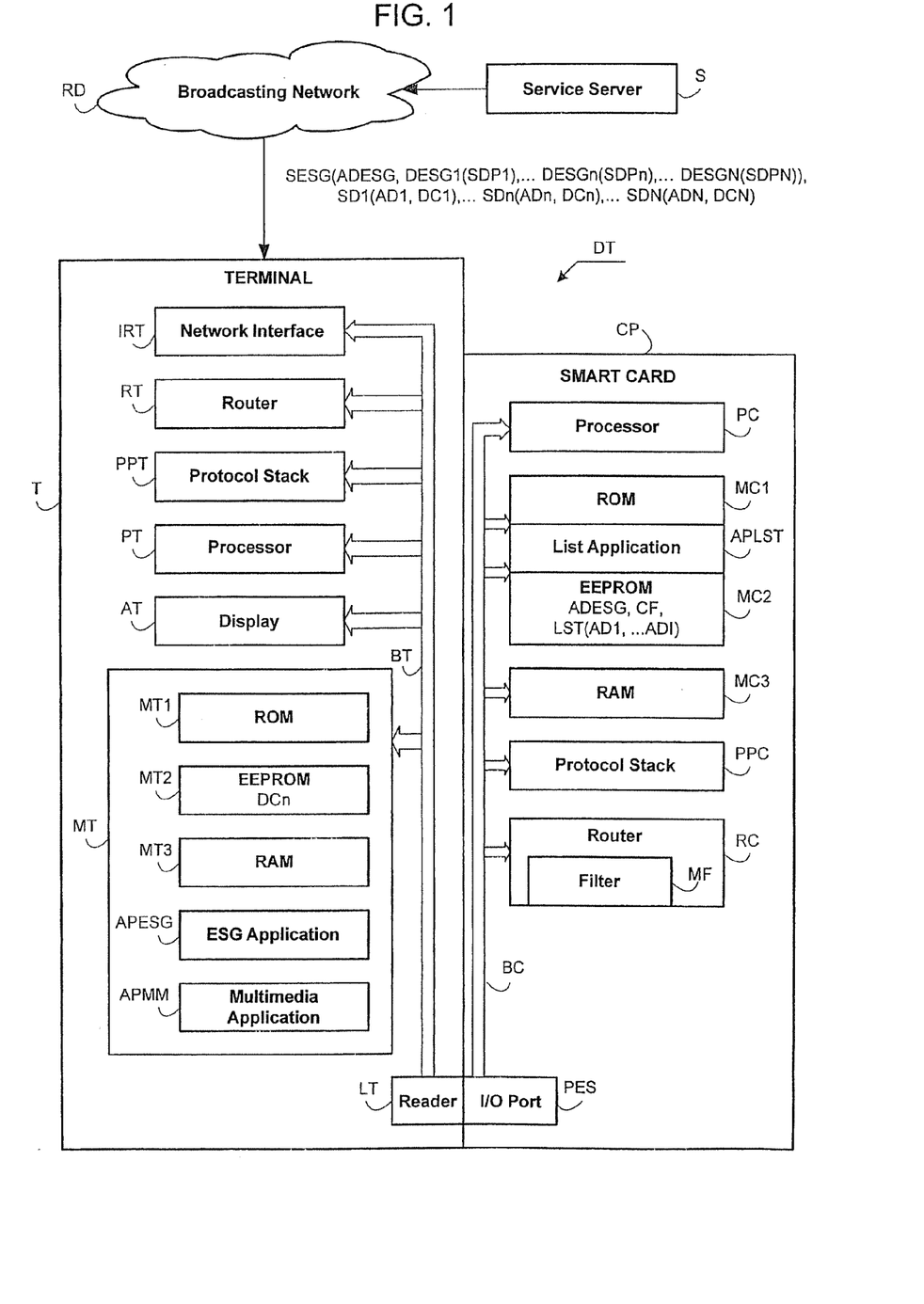
FIG. 1 is a block diagram of a terminal device of the invention having access control for controlling access to services broadcast via a broadcasting network.

As shown in FIG. 1, a broadcasting network RD broadcasts at least service signals SESG, SD1 to SDN from one or more service servers managed by service providers to user terminal devices having access control for controlling access to broadcast services. A single terminal device DT and a single service server S managed by a given operator are shown in FIG. 1 in order to avoid cluttering it.

For example, when the terminal device DT includes functionality features of an intelligent television receiver, the broadcast network RD is a cable and/or satellite television distribution network, or a digital terrestrial television network DVB-T (Digital Video Broadcasting-Terrestrial) or DVB-H (Digital Video Broadcasting-Handheld), broadcasting digital television program services.

The broadcast services SESG, SD1 to SDN are supported, in accordance with the invention, by packets of the Internet Protocol (IP) type that are transmitted in multicast mode, e.g. over a transport protocol for digital television signals MPEG2 (Motion Picture Experts Group 2) A service transmitted in multicast mode is identified by a multicast address and is receivable by a group of terminal devices having applications recorded under the address of said service in means for receiving broadcast services, e.g. a terminal device router, for accessing said service.

The broadcasting network RD broadcasts from a service server S to the terminal devices DT broadcast service signals SD1 to SDN that are identified and described in a particular service signal SESG, referred to as an "Electronic Service Guide". A service signal SDn, where $1 \leq n \leq N$, is broadcast in the form of packets including description data comprising at least one multicast address ADn identifying the service SDn, and content data DCn of a program, e.g. a television, text, or radio program.

The electronic service guide SESG includes a multicast address ADESG identifying the guide, and digital description data DESG1 to DESGN describing the content data of other broadcast services DC1 to DCN respectively.

For each broadcast service SDn relating to a television program, respective description data DESGn included in the electronic service guide is constituted, for example, by: an identifier of the program, such as the name of the program; an identifier of the operator who is broadcasting the program, broadcasting times, a digitized rating code for the program that serves for parental control, a summary of the program, the names of the cast where applicable, reviews, digital links such as Uniform Resource Locator (URL) addresses to other information that can be acquired via some other communications channel, e.g. a point-to-point radiocommunications channel for mobiles, and technical information such as the type of compression of the content data DCn associated with the service. The technical information also includes a multicast address of a Session Description Protocol (SDP) file SDPn or the file SDPn itself. The file SDPn is a technical description for acquiring the associated service SDn and it includes, inter alia, the transmission protocol of said service, and the multicast address ADn of the service and an access port for access to the service in the corresponding service server.

When the technical information includes the multicast address of the file SDPn, said file is broadcast over the communications network RD under said multicast address.

The electronic service guide SESG is broadcast periodically by a server S, e.g. every five minutes. All of the description data DESG1 to DESGN in the electronic service guide SESG is updated in the server, e.g. prior to broadcasting a new program over the broadcasting network, or after a program broadcast over the broadcasting network RD ends or is discontinued.

The user terminal device DT is shown in FIG. 1 in the form of function blocks, most of which provide functions related to the invention and can correspond to software and/or hardware modules.

The terminal device DT comprises a terminal T associated, with contact or in contactless manner, with a filter entity such as a smart card CP.

As shown in FIG. 1, the terminal T comprises a network interface IRT, a router RT, a protocol stack PPT, a processor PT, a display AT, memories MT, and a smart card reader LT.

The display AT, such as a screen, presents, i.e. displays, in particular, the description data included in the electronic service guide SESG and the content data DCn of a service selected by a user of the terminal device. By way of a variant, a speech synthesizer and a loudspeaker of the terminal T present the description data and/or the content data phonically. The display AT can be external to the terminal device and connected thereto via a specific graphics user interface. A keyboard or keypad (not shown) is incorporated into or associated with the terminal device. The various elements of the terminal device are connected together via a both-way bus BT.

The network interface IRT comprises a receiver that receives a data stream relating to the service signals SESG, SD1 to SDN broadcast via the network RD, e.g. using the MPEG2 protocol, and whose frequencies are announced in service signaling tables of the Service Information/Program Service Information (SI/PSI) type. The receiver then processes the data stream in order to obtain packets of the IP type relating to each broadcast service SESG, SD1 to SDN.

The router RT selects IP packets of at least one service, e.g. SDn, from among the packets delivered by the interface receiver IRT relating to a preceding request DE from one or more applications of the terminal T and/or of the smart card CP for obtaining the service. The request DE relates to a recording of the application in the router RT under the multicast address ADn of the requested service SDn. In accordance with the invention, the router RT transmits the selected IP packets to a protocol stack PPC of the smart card CP that redirects them to an application of the smart card, and to a router RC of the smart card CP that redirects them to the protocol stack PPT of the terminal.

The protocol stack PPT of the terminal processes the packets IP transmitted by the router RC of the smart card CP in order to deliver the selected service to the applications of the terminal T that have requested it.

The memories MT comprise three memories MT1, MT2, and MT3, one electronic service guide application APESG and one multimedia application APMM.

The memory MT1 is a non-volatile memory of the Read-only Memory (ROM) type or of the Flash type, and it includes the operating system of the terminal. The memory MT2 is a non-volatile memory, e.g. an Electrically Erasable Programmable Read-Only Memory (EEPROM) or a Flash memory, for storing, in particular, algorithms and keys, the multicast address ADESG of the electronic service guide SESG, and identifiers and parameters of a profile of the user of the terminal device. The memory MT3 is a Random Access Memory (RAM) or a Static Random Access Memory (SRAM) serving more particularly for data processing.

The electronic service guide application APESG interprets and presents the description data DESG1 to DESGN on the display AT.

The multimedia application APMM manages processing of a service SDn presented by the electronic service guide APESG and selected by a user, and presents the contents DCn of the selected service SDn, e.g. a film or a video sequence on the display AT, or a piece of music.

In order to obtain the services SESG and SDn, the applications APESG and APMM must respectively send recording requests DE to the router RT of the terminal T. In accordance with the invention, each recording request DE goes at least via the router RC of the filter entity constituted by the smart card CP.

As known, the smart card CP mainly comprises a processor PC, three memories MC1 to MC3, and an input/output port PES connectable with contact or in contactless manner to the reader LT for the purpose of exchanging commands and responses with the terminal T. The various elements of the card are connected together via a both-way bus BC.

The memory MC1 is a non-volatile memory of the ROM type or of the Flash type, and it includes the operating system of the card. The memory MC2 is a non-volatile memory, e.g. an EEPROM or a Flash memory, for, in particular, storing algorithms and keys, the multicast address ADESG of the electronic service guide SESG, filter criteria CF, at least one list of multicast addresses LST, and identifiers and parameters of the profile of the user possessing the card. The memory MC3 is a RAM or an SRAM serving more particularly for data processing.

In the memories MC1 and MC2, the smart card contains a list application APLST for establishing the list LST containing multicast addresses AD1 to ADI of services that, from among the services SD1 to SDN broadcast over the broadcasting network RD, are services deemed to be authorized for presentation, with the indices I and N such that $1 \leq I \leq N$. In an example relating to parental control, the list LST contains only addresses of services corresponding to cartoon programs authorized for children under ten years old.

Conversely, the list LST can contain multicast addresses of services deemed to be unauthorized for viewing. By analogy with the preceding example, the list LST contains the addresses of the services corresponding to all of the programs that are not recommended for children under ten years old.

The list application APLST interprets and filters the description data DESG1 to DESGN as a function of one or more filter criteria CF read from the memory MC2, and then, for each service SDn whose description data has been filtered and thus satisfies the filter criteria, searches for the file SDPn that is contained in or referenced by the technical information of the filtered description data, and that has the multicast address ADn of the service, and stores that address ADn in the list LST.

The list LST is stored in the memory MC2 of the smart card. The memory MC2 can contain a plurality of lists LST, each identified by an identifier of a user or of a category of user, such as a child or an adult.

Each filter criterion CF is based on one or more parameters of the same type as the description data DESGn of a service SDn and on a condition to be satisfied by service description data relative to the parameter(s). The filter criteria are predefined by the user of the terminal device and/or by the operator who supplies the terminal device. In a variant, the filter criteria are broadcast in multicast mode by the broadcasting network RD or in point-to-point mode by an access network such as a radiocommunications network, in order to be recorded in the memory MC2 of the smart card CP. The memory MC2 can contain a plurality of sets of one or more filter criteria CF, each set being identified by the identifier of a user or of a category of users.

In a first example relating to parental control, a filter criterion parameter corresponds to a rating code input by a parent. For example, a rating code of value "1" authorizes viewing of programs of the cartoon type, a rating code of value "2" does not authorize viewing of programs by children under ten years, and a rating code of value "5" authorizes viewing of programs for adults.

In another example also related to parental control, the filter criterion control corresponds to the age of the child that is stored, for example, in the memory MT2 of the terminal T or in the memory MC2 of the smart card CP.

In an example relating to control of an operator who is a partner of the operator who supplied the terminal device, the filter criterion parameters correspond to a network indicator MNC (Mobile Network Code) of a given operator extracted from a user identifier IMSI (International Mobile Subscriber Identity) or from a set of identifiers of the partner operators previously stored in a memory of a smart card associated with the terminal device.

Like the terminal T, the smart card CP further includes a protocol stack PPC and a router RC.

The router RC redirects the recording requests DE from the applications of the terminal T and from the smart card CP to the router RT of the terminal, and, conversely, redirects the selected packets from the router RT to the protocol stacks PPT, PPC for the applications that have requested them.

In accordance with the invention, the router RC of the card includes a filter module MF that intercepts and filters, as a function of the address list LST, each recording request DE from the multimedia application APMM of the terminal under an address ADn of a service SDn selected by a user, in order to authorize or not to authorize transmission of the requested packets from the router RT of the terminal to the application APMM via the router RC of the smart card CP and via the protocol stack PPT of the terminal T.

The protocol stack PPC of the smart card processes the packets IP transmitted by the router RC of the smart card in order to deliver the selected service(s) to the applications of the card, such as the list application APLST, that have requested it/them.

The recording requests DE go between the protocol stacks PPT and PPC and the routers RT and RC preferably using the Internet Group Management Protocol (IGMP).

In a first example, the terminal device DT is a mobile radio terminal for which the smart card is of the Universal Integrated Circuit Card (UICC) type. The smart card UICC is, for example, a card provided with a Subscriber Identity Module (SIM) application when the terminal is a mobile of the GSM (Global Service for Mobile Communications) type or of the GPRS (General Packet Radio Service) type. In another example, the smart card UICC is provided with a Universal Subscriber Identity Module (USIM) application, with a Removable User Identity Module (RUIM) application, or with an IP Subscriber Identity Module (ISIM) application, when the mobile terminal operates in Code Division Multiple Access (CDMA) mode of the third generation (Third Generation Partnership Project (3GPP)) of the Universal Mobile Telecommunications System (UMTS) type or of the UMTS Terrestrial Radio Access Network (UTRAN) type, or of the third generation (3GPP2) of the CDMA 2000 type.

In other examples, the terminal is a Personal Computer (PC) equipped with a smart card reader, or indeed is a small item of communicating equipment such as a Personal Digital Assistant (PDA) equipped with a smart card reader.

In further examples, the card can be a Universal Serial Bus (USB) key or stick, a Flash memory card, a secure digital card, a multimedia card, or indeed can be replaced with any removable portable recording medium having a microcontroller.

In a variant embodiment of the invention, the terminal device comprises solely the terminal containing the filter entity. Therefore, the terminal T can optionally not include any card reader LT.

Figure 2:
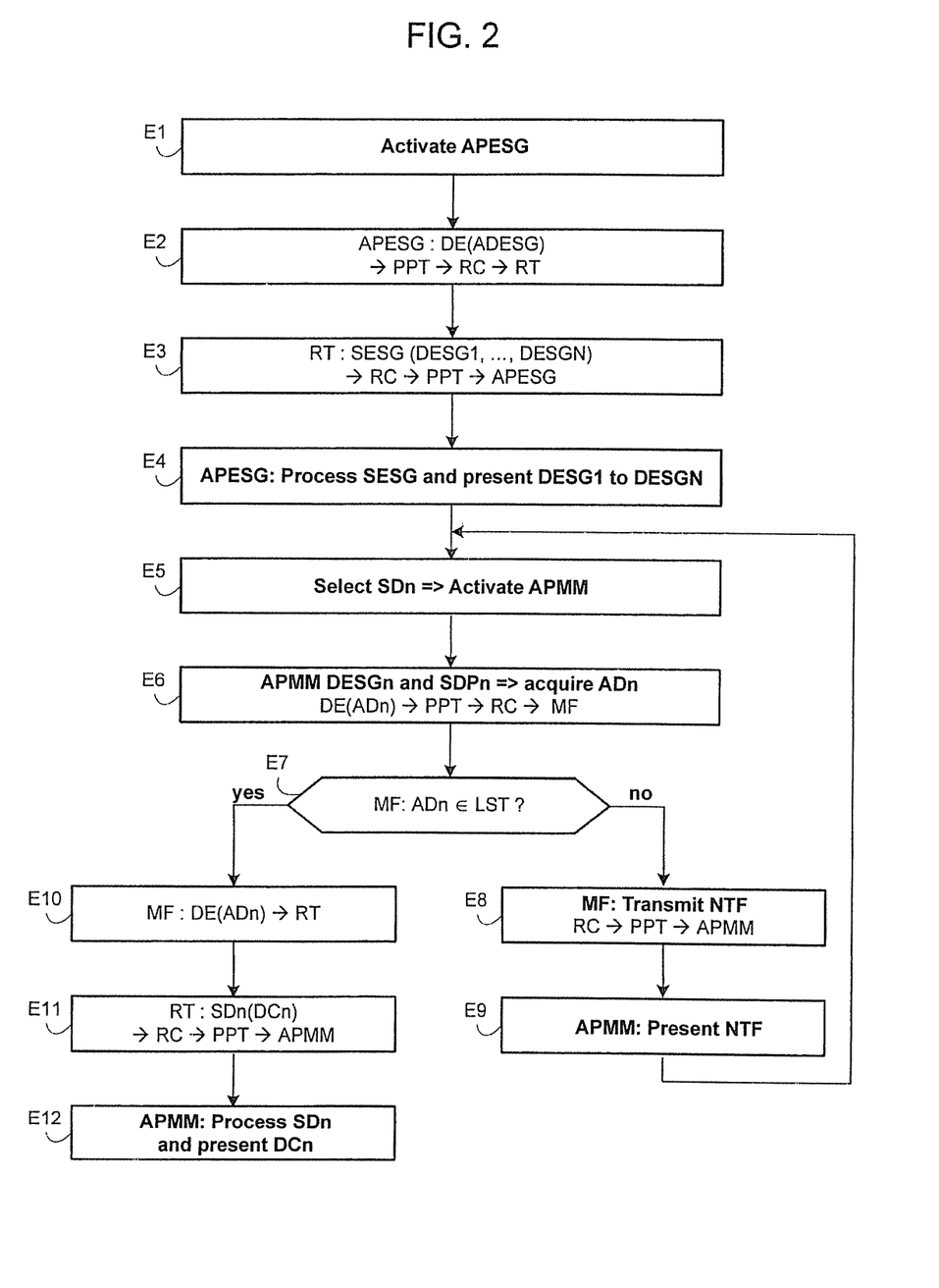
FIG. 2 is an algorithm of a method of the invention for controlling access to broadcast services, which method is implemented in the terminal device.

The method of controlling access to broadcast services that is shown in FIG. 2 is executed in part by the processor PT of the terminal T and in part by the processor PC of the smart card, when the terminal is attached to the broadcasting network RD. The method is executed transparently for the user of the terminal device. The method comprises steps E1 to E12.

Step E1 of the method relates to having the electronic service guide application activated by the processor PT of the terminal T after said application has been selected by a user of the terminal who has identified himself or herself, e.g. via the keyboard or keypad connected to the terminal or via the smart card.

Optionally, the user of the terminal authenticates himself or herself by means of a secret code.

The application APESG searches the memory MT2 of the terminal T for the multicast address ADESG identifying the electronic service guide SESG broadcast via the network RD. In step E2, the application makes a recording request DE under the address ADESG to the protocol stack PPT of the terminal in order to access the service SESG. The protocol stack PPT transmits the recording request DE(ADESG) to the router RC of the smart card, which router transmits it directly to the router RT of the terminal.

In step E3, the router RT of the terminal selects the packets IP that are identified by the address ADESG of the service SESG from among the packets delivered by the receiver of the interface IRT and transmits them directly, i.e. without them being filtered in the filter module MF, to the protocol stack PPT of the terminal via the router RC of the smart card. The protocol stack PPT processes the transmitted packets and delivers the electronic service guide SESG to the application APESG.

In step E4, the application APESG processes the service SESG in order to present the description data DESG1 to DESGN on the display AT to the user of the terminal who selected the application APESG in step E1.

In a variant, the multicast address ADESG is not a fixed address. The memory MT2 of the terminal T or the memory MC2 of the smart card contains a fixed multicast address of a primer service for priming the electronic service guide broadcast over the network RD, said primer service containing the address ADESG of the service SESG. By analogy with steps E2 and E3, the application APESG obtains the address ADESG by sending a recording request DE under the address of the primer service. Then steps E2 to E4 are executed.

In step E5, the user, on reading the displayed description data DESG1 to DESGN, selects a service SDn that he or she wishes to view, thereby activating the multimedia application APMM. In step E6, the multimedia application APMM communicates with the application APESG so as to obtain the protocol description file SPDn contained in the technical information of the description data DESGn in order to acquire the multicast address ADn of the selected service SDn. The application APMM makes a recording request DE under the address ADn to the protocol stack PPT of the terminal in order to access the service SDn. The request DE(ADn) is intercepted in the smart card by the filter module MF of the router RC.

In a variant, the technical information comprises only the multicast address of the protocol description file SDPn. Prior to step E6, the multimedia application APMM makes a recording request under the address of the file SDPn to the protocol stack PPT in order to obtain the service address ADn that is included in the file SDPn. The request is transmitted without being filtered to the router RT of the terminal via the router RC of the card. The router RT selects the packets identified by the address of the requested file SDPn and transmits them to the protocol stack PPT of the terminal via the router RC, the stack processing the selected packets in order to deliver the file SDPn to the multimedia application APMM. Then step E6 is executed.

In step E7, the filter module MF compares the address ADn of the selected service SDn with the addresses in the authorized address list LST. If the address ADn is not included in the list LST, the filter module MF does not transmit the recording request DE(ADn) to the router RT of the terminal T, and transmits to the multimedia application APMM a non-authorization notification NTF indicating that the selected service cannot be displayed, from the router RC to the protocol stack PPT of the terminal, in step E8. The application APMM presents the notification NTF to the user of the terminal via the display AT, in step E9.

If, in step E7, the address ADn is included in the list LST, the filter module MF transmits the recording request DE(ADn) to the router RT of the terminal, in step E10.

When the memory MC2 of the smart card contains a plurality of address lists LST, then, in step E7, prior to the comparison of the addresses, the module MF selects the list corresponding to the identifier of the user who identified himself or herself in step E1 on selecting the electronic service guide.

In step E11, the router RT selects the packets identified by the address ADn of the selected service SDn and transmits them to the protocol stack PPT of the terminal via the router RC. The protocol stack PPT processes the selected packets in order to deliver the service SDn to the multimedia application APMM.

In step E12, the multimedia application APMM processes the service SDn in order to present the content data DCn via the display AT to the user who asked for said content data in step E5.

In a variant in which the address list LST comprises addresses of services that are deemed unauthorized for viewing, the filter module verifies, in step E7, that the address ADn is not included in the list LST. If the address is included in the list LST, the steps E8 and E9 are executed. Otherwise, steps E10 to E12 are executed.

Figure 3:
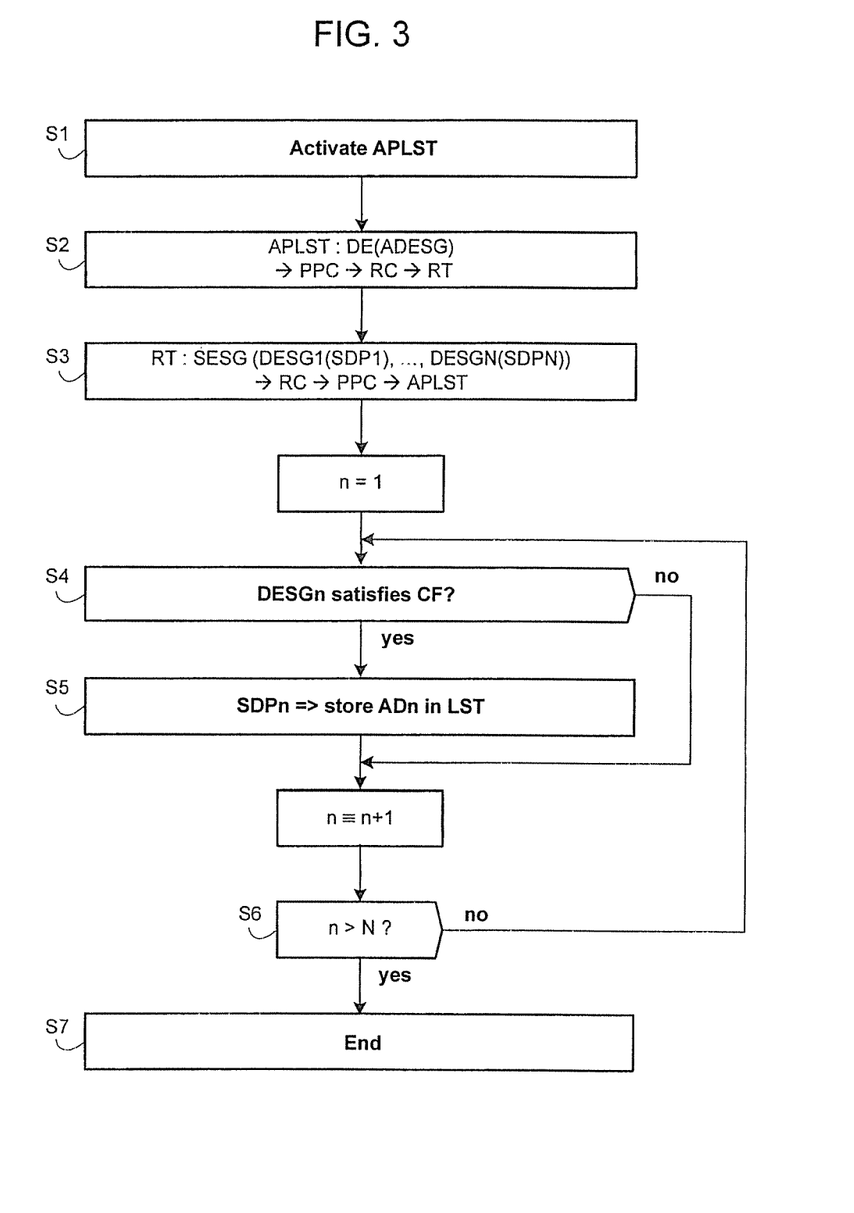
FIG. 3 is an algorithm for establishing a list of multicast addresses for access control of the invention for controlling access to broadcast services, which algorithm is implemented in the terminal device.

As shown in FIG. 3, establishing the address list LST comprises steps S1 to S7.

The processor PC of the smart card activates the list APLST in step S1, after, for example, a confidential code has been input that identifies a user who wishes to access the electronic service guide application APESG of the terminal T or who wishes to update the filter criterion parameters CF.

The application APLST searches the memory MC2 of the smart card CP for the multicast address ADESG identifying the electronic service guide SESG broadcast over the network RD. In step S2, the application makes a recording request DE under the address ADESG to the protocol stack PPC of the smart card CP in order to access the service SESG. The protocol stack PPC transmits the recording request DE(ADESG) to the router RC which transmits it directly to the router RT of the terminal T.

In step S3, the router RT of the terminal selects the IP packets identified by the address ADESG of the service SESG from among the packets delivered by the receiver of the interface IRT and transmits them directly, i.e. without filtering, to the protocol stack PPC of the smart card via the router RC of the smart card. The protocol stack PPC processes the transmitted packets and delivers the electronic service guide SESG to the application APESG.

In a variant, the multicast address ADESG is not a fixed address. The memory MC2 of the smart card contains a fixed multicast address of a primer service for priming the electronic service guide broadcast over the network RD, said primer service containing the address ADESG of the service SESG. By analogy with steps S2 and S3, the application APESG obtains the address ADESG by sending a recording request DE under the address of the primer service. Then steps S2 and S3 are executed.

Steps S4 and S5 correspond to processing description data DESGn relating to one SDn of the broadcast program services SD1 to SDN, where the index n lies in the range 1 to N. Steps S4 and S5 are repeated N times so long as not all of the description data DESG1 to DESGN relating to the program services SD1 to SDN broadcast over the network RD have been processed.

In step S4, the list application APLST applies one or more filter criteria CF relating to the identifier of the user to one or more items of data DESGn relating to the program SDn, which criteria are stored in the memory MC2 of the smart card CP and are associated with one or more chosen filter criterion parameters chosen, for example, by an authorized user. If, in step S4, the description data DESGn satisfies the criterion or criteria CF, then the list application APLST searches for the file SPDn contained in the technical information of the filtered description data DESGn in order to acquire the multicast address ADn of the service SDn and, in step 5, stores said address ADn in the list LST. Otherwise, or after step S5 has been executed, the list application APLST processes the description data DESGn+1 that is not yet processed and that relates to another program service SDn+1. in step S6, so long as the description data of all of the program services SD1 to SDN has not been processed, the application APLST continues to establish the list LST with the addresses found by the search made by the list application APLST, by executing steps S4 and S5.

As soon as all of the description data DESG1 to DESGN of all of the services SD1 to SDN has been processed, the address list is deemed to be established, in step S7.

In a variant, in step S5, the technical information comprises only the multicast address ADn of the file SDPn, implying that a recording request from the list application APLST under the address of the file SDPn is made to the protocol stack PPC of the smart card CP in order to obtain the address ADn of the service included in the file SDPn. The request is transmitted to the router RT of the terminal via the router RC of the card. The router RT selects the packets identified by the address of the requested file SDPn and transmits them to the protocol stack PPC via the router RC, the stack processing the selected packets in order to deliver the file SDPn to the application APLST. The application APLST stores the address ADn in the list LST.

The invention described herein relates to a method and to a terminal device for controlling access to services that are broadcast in multicast mode via a broadcasting network. In a preferred implementation, the steps of the method are determined by the instructions of a program that is suitable for being implemented in the terminal device DT such as a computer, a digital television receiver, or a mobile terminal, or any other communicating intelligent terminal connected to a broadcasting network, or indeed suitable for being implemented in a portable electronic object having a microcontroller, such as a smart card, in association with such a terminal device or with a terminal. The program includes instructions that perform the steps of the method of the invention when said program is executed in the terminal device or portable electronic object, operation of which is then controlled by executing the program.

Said program can use any programming language, and be in the form of source code, object code, code interpretable by a virtual machine, or intermediate code between source code and object code such as in a partially compiled form, or in any other form desirable for implementing the method of the invention.

The invention claimed is:

1. A method implemented in a terminal device for controlling access to services through a broadcasting network, said method comprising:
   requesting, in request issuer means, a previously selected broadcast service from broadcast service receiver means, wherein the services are broadcast in a multicast mode, and the request of a selected broadcast service includes an address of the selected service;
   comparing, in a filtering entity, the address included in the request with addresses included in an address list; and
   when the list comprises addresses of services that are deemed to be authorized, the filtering entity authorizing transmission of the selected service from the receiver means to the request issuer means, to present said service if the address is included in the list and
   when the list comprises addresses of services that are deemed to be unauthorized, the filtering entity not authorizing transmission of the selected service from the receiver means to the request issuer means, to not present said service if the address is included in the list.

2. The method according to claim 1, further comprising:
   requesting, in means for establishing an address list, an electronic service guide broadcast by the broadcasting network from broadcast service receiver means, said electronic service guide containing description data describing the other broadcast services,
   wherein the means for establishing an address list performs the steps of:
      filtering the description data relating to the broadcast services as a function of at least one filtering criterion;
      searching for the addresses of broadcast services in the filtered description data; and
      establishing the address list with the addresses found through the search.

3. The method according to claim 2, in which said at least one filter criterion depends on a digitized code corresponding to parental control.

4. The method according to claim 2, in which said at least one filter criterion depends on an identifier of an operator managing the broadcasting network or of a partner of the operator.

5. A terminal device for controlling access to services through a broadcasting network, said terminal device comprising:
   receiver means for receiving the broadcast services and request issuer means for issuing a request for a previously selected broadcast service to the receiver means, wherein the services are broadcast within a multicast mode, and the request of a selected broadcast service includes an address of the selected service;
   a filtering entity for comparing the address included in the request with addresses included in an address list;
   wherein the filtering entity authorizes transmission of the selected service from the broadcast service receiver means to the request issuer means to present said service if the address is included in the list, and when the list comprises addresses of services that are deemed to be authorized, and
   wherein the filtering entity does not authorize transmission of the selected service from the receiver means to the request issuer means to not present said service if the address is included in the list and when the list comprises addresses of services that are deemed to be unauthorized.

6. The terminal device according to claim 5, comprising:
   a terminal including the request issuer means and the receiver means; and
   a smart card including the filter entity.

7. The terminal device according to claim 5, further comprising:
   means for establishing an address list, which means makes a prior request to the receiver means for an electronic service guide broadcast by the broadcasting network and including description data describing the other broadcast services, said means for establishing an address list comprising:
      means for filtering the description data relating to the broadcast services as a function of at least one filtering criterion; and
      means for searching for the addresses of broadcast services in the filtered description data in such a manner as to establish the address list with the addresses found by the means for searching.

8. The terminal device according to claim 7, in which the means for establishing the address list is included in the filtering entity.

* * * * *